May 20, 1958 M. N. FAIRBANK 2,835,179
PHOTOGRAPHIC APPARATUS
Filed Jan. 25, 1954
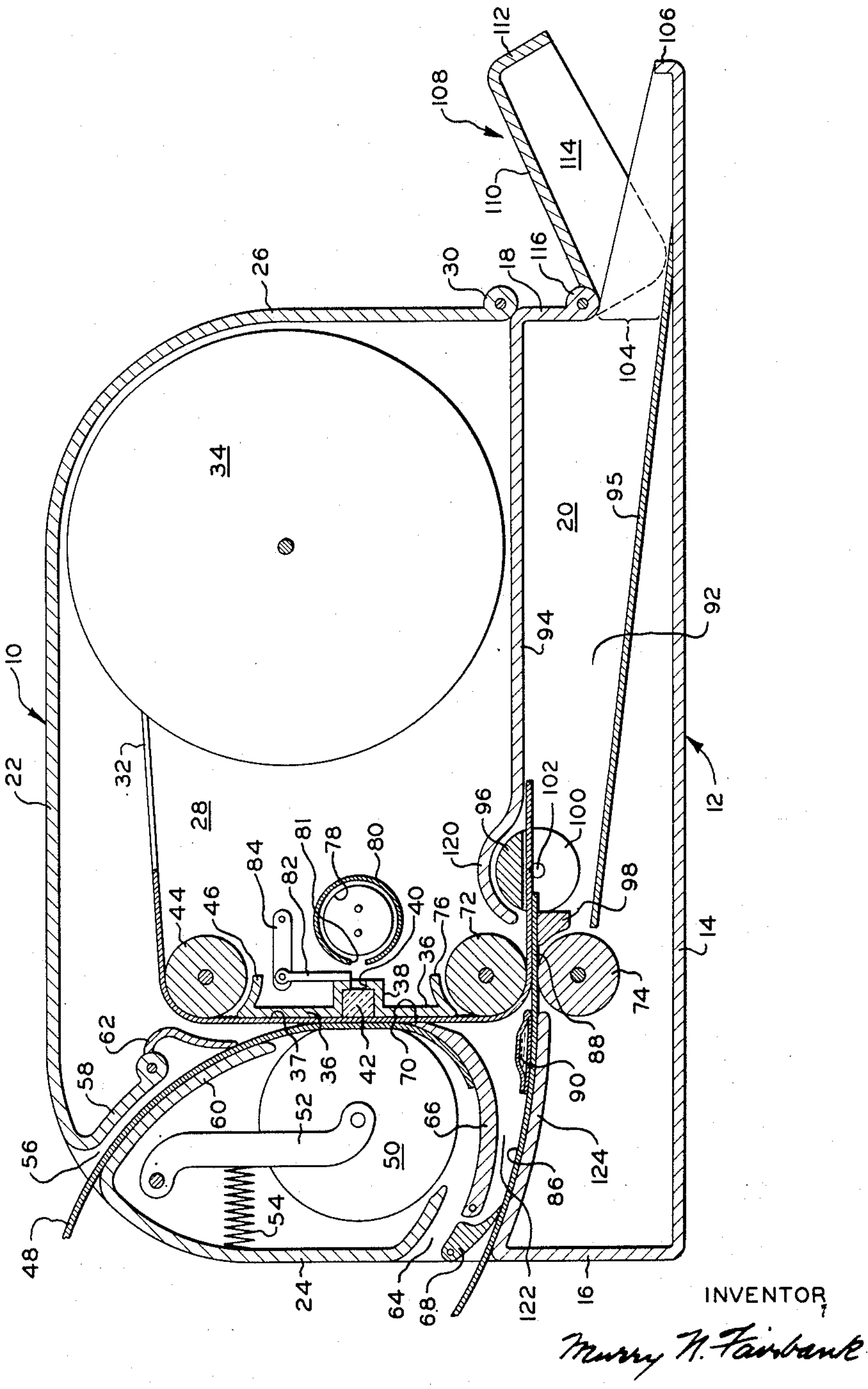
INVENTOR
Murry N. Fairbank
BY Brown and Mikulka
ATTORNEYS 2,835,179
Patented May 20, 1958

2,835,179

PHOTOGRAPHIC APPARATUS

Murry N. Fairbank, Belmont, Mass., assignor to Polaroid Corporation, Cambridge, Mass., a corporation of Delaware Application January 25, 1954, Serial No. 405,742

10 Claims. (Cl. 95—75)

This invention relates to photography and, more particularly, to novel photographic apparatus.

Photographic devices have been proposed using diffusion transfer processes for copying or duplicating sheets of subject matter, these devices involving a substantially two-operation process. In such a device, a sheet of photosensitive material is first superposed on the subject matter to be copied and the two sheets held in superposition while the photosensitive sheet is exposed to actinic light which is directed through the photosensitive sheet to the subject matter and reflected therefrom to form a latent image in the photosensitive sheet. Thereafter, the exposed photosensitive sheet is withdrawn from the device and is developed by superposing it on a second sheet and immersing the two sheets in a liquid processing composition capable of effecting the formation of a positive transfer image in the second sheet. While devices and processes of the above type are essentially satisfactory, they involve not only the use of liquids and tanks, but also two distinct operations, each of which necessitates the manual handling of the photosensitive sheet in the presence of environmental light. Emulsions used in the process must, of necessity, be substantially slow to prevent their fogging and consequently require relatively long exposure to substantially intense actinic light in order to produce a latent image.

It is therefore an object of the present invention to provide a photographic device for copying a sheet of subject matter and comprising means for advancing a sheet of photosensitive material entirely within a lighttight environment and superposing successive areas of said sheet on said subject matter, means for predeterminedly exposing said areas to actinic light, means for separating said areas from said subject matter, and means for developing said areas by superposing them on a second sheet with a layer of processing composition therebetween.

Further objects of the invention are to provide, in devices of the above type: means for guiding a sheet of subject matter into superposition with a portion of said photosensitive sheet; means for holding said subject matter in superposition with said photosensitive sheet during exposure of said sheet and said subject matter to actinic light; means for separating said subject matter from said photosensitive sheet and guiding said subject matter out of said device; means for accurately controlling the exposure of said subject matter and said photosensitive sheet to actinic light; pressure-applying means for superposing exposed areas of said photosensitive sheet on a second sheet and spreading a layer of processing composition therebetween; and means for severing developed portions of said photosensitive sheet from remaining portions of said sheet.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a diagrammatic, sectional view of a copying device embodying the present invention, the section being taken along a line midway between the sides of the device.

Photographic apparatus of the type herein illustrated generally includes means for processing an exposed photosensitive sheet by superposing it on a second sheet and by spreading a thin layer of processing composition between the sheets. By way of example, the photosensitive sheet includes a silver halide layer, the second sheet includes a silver precipitating layer, and the processing composition includes a developer, a silver halide solvent and an alkali. The layer of processing composition between the photosensitive and second sheets is formed by advancing the sheets between a pair of pressure-applying members. In the presence of this layer of processing composition, a latent image in the photosensitive sheet is developed to silver and a soluble silver complex from unexposed silver halide is formed, is transferred by imbibition to the second sheet, and there is developed to silver to produce a positive image.

The photographic process and various species and alternative forms of photosensitive and other sheets herein referred to are described in detail in Patent No. 2,543,181, issued to Edwin H. Land on February 27, 1951 for Photographic Product Comprising a Rupturable Container Carrying a Photographic Processing Liquid. It is, of course, to be understood that the apparatus herein described is not limited to use with any particular species of photosensitive or other sheets, the terms "photosensitive sheet" and "second sheet" being used in their broadest sense to indicate a first sheet which is photosensitive and a second sheet which merely may aid in spreading the processing composition over the surface of the photosensitive sheet or which may, if desired, possess other characteristics.

Generally, the embodiment of the herein disclosed invention illustrated in the accompanying drawings is a device for copying or duplicating sheet subject matter such as letters and the like. The device includes a substantially lighttight housing in which may be mounted a supply of photosensitive sheet material. The housing is provided with a slot or guide passage in the upper portion of one end into which a sheet of copy material may be inserted. The sheet is guided by the walls of the said passage into superposition with a portion of the photosensitive sheet as the latter is advanced past the end of said passage. The photosensitive sheet is advanced across a substantially flat exposure surface having therein an aperture through which is directed actinic light from a suitable source. A pad roll is provided opposite said aperture for holding the copy sheet in contact with the photosensitive sheet as the latter is advanced along the exposure surface past the aperture therein. A curved guide plate is provided having an edge adapted to bear against the surface of the photosensitive sheet for separating the copy sheet therefrom and guiding said copy sheet through an exit passage in the end wall of the device.

The copying device further includes a pair of pressure-applying rolls adapted to superpose the photosensitive sheet on a second sheet and spread a thin layer of processing composition between said sheets. The end wall of the device is provided with a passage into which the end of said second sheet may be inserted, said passage guiding said second sheet into superposition with the photosensitive sheet between the pressure-applying rolls.

In order to advance the photosensitive sheet from its supply past the exposure aperture and into superposition with the second sheet, one or both of the pressure-applying rolls may be driven. The device includes an imbibition chamber into which the superposed photosensitive and second sheets are advanced from the pressure-applying rolls and means for severing the portions of the photosensitive sheet advanced into said chamber from those portions remaining between the pressure-applying rolls. A door at one end of the imbibition chamber may be opened at the end of a predetermined imbibition time and the superposed photosensitive and second sheets may be removed from the chamber and stripped apart.

Referring now to the drawing, wherein like numerals denote like parts, there is illustrated, somewhat schematically, a photographic copying device embodying the present invention. The device includes a housing comprising an upper cover section 10 and a lower base section 12. Base section 12 includes a bottom wall 14, end walls 16 and 18 and two upstanding side walls, one of which is indicated at 20. The cover section 10 includes a top wall 22, two end walls 24 and 26 curved to join a top wall 22, and two side walls, one of which is indicated at 28. The cover section 10 and lower section 12 are adapted to join together to form a lighttight housing and may be pivotally connected to one another at a hinge 30 secured to end walls 18 and 26 to permit loading and threading of sheet material into the device. A supply of photosensitive sheet material is mounted within upper section 10 of the housing adjacent end wall 26. Photosensitive sheet 32 may be coiled on a spool 34 of conventional design mounted between the side walls of the upper section 10 or in a suitable magazine similarly mounted.

Means are provided defining a surface across which photosensitive sheet 32 is advanced during exposure to actinic light. As shown, this means comprises a guide plate 36 mounted in a vertical position with respect to bottom wall 14 between the side walls of upper section 10 and providing a substantially flat surface 37 in contact with which photosensitive sheet 32 may be advanced. Plate 36 includes an elongated reentrant section 38 extending transversely of the direction of advancement of photosensitive sheet 32, and equal in width thereto, reentrant section 38 having an exposure aperture or slit 40. An elongated element 42 is secured within reentrant section 38 to provide a continuous flat surface across exposure aperture 40 in contact with which photosensitive sheet 32 is advanced during exposure. Element 42 may be formed of any suitable material such as glass or plastic capable of transmitting light with or without modification. The surface of element 42 which contacts photosensitive sheet 32 is substantially flat and is located in the same plane as surface 37 of plate 36. A guide roll 44 is provided adjacent top wall 22 and the upper portion of guide plate 36, the upper edge portion 46 of the latter being shaped to conform substantially to the curvature of guide roll 44. Photosensitive sheet 32 thus extends in a path from supply spool 34 around guide roll 44 and into contact with and across guide surface 37 of guide plate 36.

As a means for holding a sheet of copy matter, generally indicated at 48, in contact with photosensitive sheet 32 and for holding the latter in contact with guide plate 36 and element 42 as the sheets are advanced past exposure aperture 40, there is provided a pad roll 50. Pad roll 50 may be mounted between a pair of arms 52 pivotally mounted at their ends on the side walls of cover section 10 and resiliently urged toward guide surface 37 into contact with the sheets by such means as a compression spring 54. At least the surface of pad roll 50 is formed of a suitable pliant material such as sponge rubber, felt or the like, which is capable of being deformed so as to exert a substantially uniform pressure over a substantial area of the sheets as they are advanced across the exposure aperture in contact with element 42.

As a means for guiding copy sheet 48 into superposition with a portion of photosensitive sheet 32, there is provided a guide passage 56 in top wall 22 of upper section 10 above pad roll 50, said guide passage having upper and lower guide walls 58 and 60 extending angularly downward toward guide plate 36. A copy sheet 48 inserted into passage 56 is guided by walls 58 and 60 into superposition with photosensitive sheet 32 at a point adjacent to and above the line of contact between pad roll 50 and the sheets. As photosensitive sheet 32 is advanced between roll 50 and guide surface 37, copy sheet 48 is drawn between roll 50 and photosensitive sheet 32 and advanced in superposition with sheet 32 by the friction between the two sheets. To prevent exposure of photosensitive sheet 32 by light entering and passing through guide passage 56, walls 58 and 60 thereof may be curved. In addition, upper wall 58 is provided with a pivotal closure member 62 adapted to hang downwardly in contact with lower wall 60, thereby closing passage 56. Closure member 62 may be deflected by a copy sheet 48 iserted into the passage and a portion of said member then rides on the surface of sheet 48 as it moves through passage 56. Suitable spring means may be associated with closure member 62 for resiliently urging the latter into closure position or into contact with copy sheet 48 as it moves through passage 56.

As exit passage 64 is provided in the end of the device between end wall 24 of upper section 10 and end wall 16 of lower section 12, through which passage copy sheet 48 may be ejected following exposure in superposition with photosensitive sheet 32. Exit passage 64 is defined by a curved guide plate 66 and the upper surface of a closure member 68. Guide plate 66 is curved and pivotally mounted along one edge so that its surface is below and substantially parallel with the surface of pad roll 50 and its opposite edge 70 extends transversely of photosensitive sheet 32. Edge 70 is suitably formed or sharpened so as to ride on a surface of photosensitive sheet 32 and separate copy sheet 48 from said photosensitive sheet following exposure. Copy sheet 48 is directed by plate 66 through passage 64, the latter being curved to prevent admission of light resulting in possible exposure of photosensitive sheet 32.

Pressure-applying means are provided for processing an exposed area of photosensitive sheet 32 by superposing said sheet on a second sheet and by spreading a processing composition between said sheets. The pressure-applying means comprises a pair of rollers 72 and 74, the axes of said rollers extending transversely of the direction of movement of photosensitive sheet 32 and the surfaces of said rollers being substantially tangent to the plane of guide surface 37. Roller 72 is mounted preferably on upper section 10 adjacent guide plate 36 while roller 74 is mounted on lower section 12 of the housing. By virtue of this mounting arrangement, rollers 72 and 74 may be separated from one another to permit threading of sheet materials therebetween while suitable resilient means may be provided for urging rollers 72 and 74 toward one another when sections 10 and 12 of the housing are in closed position. The lower portion 76 of guide plate 36 is bent and shaped to conform substantially to the curvature of roller 72, the latter being positioned closely adjacent portion 76. Thus, photosensitive sheet 32 extends from its supply around roll 44 into contact with surface 37 of guide plate 36, across element 42 and aperture 40 and around roller 72 between the same and roller 74. To advance sheet 32 and copy matter 48 past aperture 40, drive means may be provided for rotating either or both of pressure-applying rollers 72 and 74.

In accordance with the present invention, means are provided for actinically exposing photosensitive sheet 32 and for accurately controlling said exposure. In the form shown, this means includes a source of illumination indicated at 78 and mounted within a cylindrical shield 80 having a longitudinal slot or aperture 81 positioned adjacent exposure aperture 40 in guide plate 36. Source of illumination 78 and shield 80 are substantially equal in length to aperture 40, shield 80 being adapted to prevent light from source 78 from exposing portions of sheet 32 within the housing and to direct the light from said source through exposure aperture 40. End portions 46 and 76 of guide plate 36 are shaped to conform substantially to the curvature of, respectively, the surface of roll 44 and roller 72 in order to protect photosensitive sheet 32 from light emitted from source 78.

The light emanating from source 78 and passing through aperture 40 may be controlled by varying the width of said aperture by such means as an elongated blade 82 positioned between guide plate 36 and shield 80 and extending lengthwise of aperture 40. Blade 82 may be pivotally mounted at its ends on means such as pivotal arms 84 secured to the side walls of upper portion 10. Movement of blade 82 into position to partially or entirely close aperture 40 may be effected by pivotal movement of arms 84. As a photosensitive sheet 32 and subject matter 48 held in contact therewith are advanced past aperture 40, light emanating from source of illumination 78 is directed through photosensitive sheet 32 to the subject matter and is differentially absorbed by the dark and light portions of the subject matter. Since the light portions reflect a greater amount of light back to the photosensitive sheet than do the dark portions, areas of the photosensitive sheet adjacent light portions of the subject matter are exposed to a greater degree than are areas of the photosensitive sheet adjacent top portions. By virtue of the foregoing arrangement of elements, exposure of the photosensitive sheet 32 as it is advanced past aperture 40 may be accurately controlled by varying the speed of advancement of said sheet past exposure aperture 42 and/or varying the width of said aperture with blade 82.

A second sheet adapted to be processed in conjunction with a photosensitive sheet 32 is indicated at 86 with a conventional leader 88 attached at its leading end. Pod 90 is provided for carrying a supply of processing composition, said pod being secured to leader 88 or to photosensitive sheet 86 adjacent the leading edge of said sheet and having a mouth, which is normally sealed, directed toward the trailing edge of sheet 86. Leader 88 may be inserted between pressure-applying roller 74 and photosensitive sheet 32, and as the latter is advanced between rollers 72 and 74, leader 88, pod 90 and second sheet 86 are drawn in superposition with the photosensitive sheet between the rollers. When pod 90 passes between rollers 72 and 74 and is subjected to compressional forces, its mouth is ruptured and its liquid content discharged between photosensitive sheet 32 and second sheet 86 where it is spread in a uniformly thin layer by continued advancement of the sheets between rollers 72 and 74. To permit separation of the major portion of second sheet 86, on which may be formed a transfer print, from the leading end portion thereof, to which are secured leader 88 and pod 90, sheet 86 may be perforated or pre-cut transversely adjacent said pod.

Means are provided defining a lighttight imbibition chamber, generally indicated at 92, adjacent rollers 72 and 74 and into which a sandwich comprising photosensitive sheet 32 and second sheet 86 with a layer of processing composition therebetween may be advanced during processing. Chamber 92 is defined by bottom wall 14, end wall 18 and two side walls 20 of lower section 12. An intermediate wall 94 may be provided between upper section 10 and lower section 12 and is secured, preferably at hinge 30, to end wall 18 of lower section 12. An inclined platform 95 may be provided within chamber 92 and extends from a point adjacent roller 74 at one end of said chamber downward toward the other end of said chamber.

Cutting means are provided for successively severing portions of photosensitive sheet 32 within imbibition chamber 92 from remaining portions of said sheet as a sandwich formed of second sheet 86 and a portion of photosensitive sheet 32 are advanced into imbibition chamber 92. As shown, the cutting means comprises a cutting blade 96 and an anvil 98, blade 96 being mounted at its ends on a pair of disklike elements 100 and anvil 98 being suitably mounted closely adjacent roller 74. Elements 100 may be pivotally mounted on stub shafts 102 journalled in the side walls of lower section 12. To rotate blade 96 and to sever sheet 32, manually operable crank means may be provided or said blade may be operatively connected with a suitable drive and operating mechanism later to be described.

To permit removal from imbibition chamber 92 of a sandwich formed in a portion of photosensitive sheet 32 and second sheet 86, there is provided an opening 104 in the lower portion of end wall 18 adjacent bottom wall 12, the latter having an extended portion turned up at its end 106 to form, in conjunction with extended portions of side walls 20, a tray associated with opening 104. Because a sandwich advanced into imbibition chamber 92 may be sensitive to light during the initial part of its processing period, it is desirable that chamber 92 be substantially lighttight. A lighttight closure for opening 104 and a cover for the tray is provided and, in the form shown, comprises a cover member 108 having a top 110, end 112 and two side walls 114 pivotally mounted on end wall 18 adjacent opening 104 on a hinge 116. Cover 108 is adapted to fit over the tray in a lighttight fashion and may be raised to permit withdrawal of a processed sandwich from the imbibition chamber when processing thereof is complete. To prevent the entrance of light from imbibition chamber 94 into the upper section 10 of the housing when door 108 is opened for removal of a sandwich therefrom, intermediate wall 94 includes an end portion 120 shaped to conform to the curvature of cutting blade 96 and positioned closely adjacent said blade to prevent passage of light between the latter and end portion 120 of wall 94.

To permit insertion of second sheet 86, there is provided a passage 122 in the end of the device between end walls 24 and 16 and immediately below passage 64. Passage 122 is defined by a turned-over support portion 124 of end wall 16, said support portion 124 being curved and extending substantially toward roller 74. A curved closure member 68 pivotally mounted on bottom section 12 above passage 122 is effective to close said passage to light and may be deflected sufficiently to permit insertion of leader 88, sheet 86 and pod 90. When a leader 88 and sheet 86 are inserted into passage 122, they are supported on and guided by support member 124 between pressure-applying rollers 72 and 74.

In operating the device, a sheet of copy matter is inserted into passage 56 until its leading edge comes to rest against photosensitive sheet 32 extending from roll 44 across surface 37 and between pressure-applying rollers 72 and 74. A second sheet, including a leader and pod, is inserted into passage 122 until the leading edge of the leader extends into the bite of pressure-applying rollers 72 and 74. The device may include either manual or automatic drive mechanism such as an electric motor, not shown, which, when the various sheets have been positioned as described, is effective to energize source of illumination 78 and rotate either or both of pressure-applying rollers 72 and 74. As the rollers commence to rotate, sheet 32 is advanced between pad roll 50 and surface 37, drawing copy sheet 48 along past exposure aperture 40. At the same time, leader 88 is advanced between pressure-applying rollers 72 and 74 in superposition with photosensitive sheet 32. The length of leader 88 is so adjusted with respect to the length of photosensitive sheet 32, extending at the beginning of a cycle from a point adjacent exposure aperture 40 to said pressure-applying rollers, that pod 90 passes between the rollers and discharges its contents at the leading edge of the exposed area of photosensitive sheet 32 as it is superposed on second sheet 86. As photosensitive sheet 32 and second sheet 86 are advanced between pressure-applying rollers 72 and 74 into imbibition chamber 92, the processing composition discharged from pod 90 is spread between the sheets in a thin layer to form a sandwich. When the sandwich has been advanced completely into imbibition chamber 92, rotation of pressure-applying rollers 72 and 74 is discontinued and the drive means are rendered effective to rotate cutting blade 96 to sever photosensitive sheet 32 at anvil 98. At the end of a predetermined processing time, door 108 may be opened and the severed sandwich removed, permitting second sheet 86 carrying a transfer image to be stripped from the photosensitive sheet.

A number of additions to and modifications of the herein-disclosed device are feasible and within the scope of the invention and in particular, they are the provision of means for so controlling the length of sheet 32 advanced that it corresponds to the length of the copy matter to be duplicated, modifications in the length of the second sheet to conform to the length of the copy matter, the supplying of the second sheet from such means as a continuous roll, and locking means adapted to permit the opening of door 108 and exposure or removal of a sandwich only after processing thereof is complete or has progressed past the stage when the sheets are sensitive to light.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Photographic apparatus for copying sheet subject matter and comprising, in combination, a housing defining a substantially lighttight chamber within which a supply of photosensitive sheet material is mounted and through which said sheet material is advanced, support means defining a guide surface across which said photosensitive sheet is advanced, guide means defining a curved passage in the upper section of said housing communicating with the exterior of said chamber for guiding a copy sheet through said passage into superposition with each of successive areas of said photosensitive sheet as the latter is advanced across said guide surface, closure means mounted within said passage for rendering said passage lighttight, means as mounting said closure means for pivotal movement that it may be deflected by a copy sheet to permit the movement thereof through said passage, means for holding said copy sheet in superposition with said photosensitive sheet and the latter in contact with said guide surface, the last-mentioned means including a pad roll at least the surface of which is formed of a substantially pliant material, means mounting said pad roll for movement toward and away from said guide surface and resilient means normally urging said pad roll toward said guide surface, means mounted within said chamber and including a source of illumination and shielding means for confining and so directing the light emanating from said source as to expose an area of said photosensitive sheet and the copy sheet superposed therewith to actinic light as said sheets are advanced across said guide surface and thereby form a record of said copy sheet in said area, a curved guide plate pivotally mounted adjacent said guide surface for thereafter separating said copy sheet from said photosensitive sheet during movement of said sheets across said guide surface and for guiding said copy sheet from said chamber, said guide plate providing one side of a curved passage communicating with the exterior of said chamber for guiding said copy sheet therefrom, and means located within said chamber closely adjacent said guide means for superposing a second sheet with said photosensitive sheet and so distributing a processing composition between the outer surfaces of said photosensitive and second sheets as to be capable of processing said sheets and producing a finished copy of said copy sheet, the last-mentioned means being so positioned within said chamber adjacent said guide surface that said photosensitive sheet is moved thereto from said guide surface in a light-free environment within said lighttight chamber.

2. Photographic apparatus for copying sheet subject matter and comprising, in combination, a housing defining a substantially lighttight chamber within which a supply of photosensitive sheet material is mounted and through which said sheet material is advanced, support means defining a guide surface across which said photosensitive sheet is advanced, guide means defining a curved passage in the upper section of said housing communicating with said guide surface for guiding a copy sheet through said passage into superposition with each of successive areas of said photosensitive sheet as each area is advanced across said guide surface, closure means mounted within said passage for preventing the admission of environmental light into said chamber, means so mounting said closure means that the latter may be deflected to allow movement of a copy sheet through said passage, means for holding said copy sheet in superposition with said photosensitive sheet and the latter in contact with said guide surface, the last-mentioned means including a pad roll having at least a surface portion formed of a substantially pliant material, pivotal means mounting said pad roll for movement toward and away from said guide surface and resilient means normally urging said pad roll toward said guide surface, means mounted within said chamber and including a source of illumination and shielding means for confining and so directing the light emanating from said source as to expose an area of said photosensive sheet and the copy sheet superposed therewith to actinic light as said sheets are advanced across said guide surface and thereby form a record of said copy sheet in said area, a guide plate pivotally mounted adjacent one end with its free end in contact with said photosensitive sheet supported on said guide surface for thereafter separating said copy sheet from said photosensitive sheet as the latter moves across said guide surface and for guiding said copy sheet from said chamber, the last-mentioned means cooperating with said pad roll to define a curved passage communicating with the exterior of said chamber for guiding said copy sheet from said chamber following separation from said photosensitive sheet, the last-named passage being curved to preclude the admission of environmental light into said chamber, and means for superposing a second sheet with each exposed area of said photosensitive sheet within said chamber and so distributing a processing composition between the outer surfaces of said photosensitive and second sheets as to effect the processing of said sheets to produce a finished copy of said copy sheet, the last-mentioned means being so positioned within said chamber adjacent said guide surface that said photosensitive sheet is exposed and processed in a light-free environment entirely within said chamber.

3. Photographic apparatus for copying sheet subject matter and comprising, in combination, a housing providing a substantially lighttight chamber within which a supply of photosensitive sheet is mounted and advanced, means for intermittently advancing said photosensitive sheet entirely within said chamber, support means defining a guide surface across which said photosensitive sheet is advanced, guide means defining a curved passage in the upper section of said housing communicating with said guide surface for guiding a copy sheet through said passage into superposition with each of successive areas of said photosensitive sheet as the latter moves across said guide surface, an elongated aperture in said support means extending transversely of the path of movement of said photosensitive sheet across said guide surface and substantially from side to side thereof, means mounted within said chamber and including a source of illumination and shielding means confining and so directing the light emanating from said source through said aperture as to expose an area of said photosensitive sheet and the copy sheet superposed therewith to actinic light as said sheets move across said guide surface and thereby form a record of said copy sheet in said area, means for holding said copy sheet in superposition with said photosensitive sheet and the latter in contact with said guide surface, the last-mentioned means comprising a pad roll having at least a surface portion formed of a substantially pliant material, pivotal means mounting said pad roll for movement toward and away from said guide surface and resilient means normally urging said pad roll toward said guide surface, a curved guide plate having a wedge-shaped end portion, means for pivotally mounting said guide plate adjacent its other end with said wedge-shaped end portion in contact with the surface of said photosensitive sheet supported on said guide surface below said aperture, said guide plate, following exposure of said photosensitive sheet, separating said copy sheet from said photosensitive sheet, said guide plate cooperating with said pad roll to define a curved passage communicating with the exterior of said chamber for guiding said copy sheet therefrom, and means for superposing a second sheet with each exposed area of said photosensitive sheet within said chamber and so distributing a liquid composition between the outer surfaces of said superposed photosensitive and second sheets as to be capable of processing said sheets to produce a finished copy of said copy sheet.

4. Photographic apparatus for copying sheet subject matter and comprising, in combination, a housing defining a substantially lighttight chamber within which a supply of photosensitive sheet material is mounted and is advanced, means for intermittently advancing said photosensitive sheet entirely within said lighttight chamber, support means defining a guide surface across which said photosensitive sheet is moved, guide means defining a curved passage in the upper section of said chamber communicating with said support surface for guiding a copy sheet through said passage into superposition with each of successive areas of said photosensitive sheet as the latter moves across said guide surface, an elongated aperture in said support means extending transversely of the path of movement of said photosensitive sheet across said guide surface and substantially from side to side thereof, means mounted within said housing and including a source of illumination and shielding means for confining and so directing the light emanating from said source through said aperture as to expose an area of said photosensitive sheet and the copy sheet superposed therewith to actinic light as said sheets are advanced across said guide surface and thereby form a record of said copy sheet in said area, means for holding said copy sheet in superposition with said photosensitive sheet and the latter in contact with said guide surface, the last-mentioned means comprising a pad roll having at least a surface portion formed of a substantially pliant material, pivotal means mounting said pad roll adjacent said support member for movement toward and away from said guide surface and resilient means normally urging said pad roll toward said guide surface, a curved guide plate pivotally mounted at one end with its free end in contact with said photosensitive sheet supported on said guide surface below said aperture for thereafter separating said copy sheet from said exposed photosensitive sheet, said guide plate cooperating with said pad roll to define a first curved passage communicating with the exterior of said chamber for guiding said copy sheet therefrom, a pair of pressure-applying members mounted adjacent the lower end of said guide surface for superposing a second sheet with each exposed area of said photosensitive sheet within said housing and for so distributing a liquid composition between the outer surfaces of said photosensitive and second sheets as to be capable of processing said sheets to produce a finished copy of said copy sheet, and means defining a second passage communicating with the exterior of said chamber and located immediately below said first passage for guiding one of said second sheets into superposition with each of said successive exposed areas of said photosensitive sheet during advancement of the latter between said pressure-applying members.

5. Photographic apparatus for copying sheet subject matter and comprising, in combination, a housing providing a substantially lighttight chamber within which a supply of photosensitive sheet material is mounted and said sheet material is advanced, means for intermittently advancing said photosensitive sheet entirely within said lighttight chamber, support means defining a guide surface across which said photosensitive sheet is advanced, guide means defining a curved passage in the upper section of said housing communicating with said support surface for guiding a copy sheet through said passage into superposition with each of successive areas of said photosensitive sheet as the latter is advanced across said guide surface, an elongated aperture in said support means extending transversely of the path of movement of said photosensitive sheet across said guide surface and substantially from side to side thereof, means mounted within said chamber and including a source of illumination and shielding means for confining and so directing the light emanating from said source through said aperture as to expose an area of said photosensitive sheet and the copy sheet superposed therewith to actinic light as said sheets are advanced across said guide surface and thereby form a record of said copy sheet in said area, means for holding said copy sheet in superposition with said photosensitive sheet and the latter in contact with said guide surface, the last-mentioned means including a pad roll having at least a surface portion formed of a substantially pliant material, pivotal means mounting said pad roll adjacent said support member for movement toward and away from said guide surface and resilient means normally urging said pad roll toward said guide surface, a curved guide plate having a wedge-shaped end portion and pivotally mounted adjacent its other end with said wedge-shaped end portion in contact with said photosensitive sheet supported on said guide surface below said aperture, said guide plate separating said copy sheet from said photosensitive sheet following exposure of the latter and cooperating with said pad roll to define a first curved passage communicating with the exterior of said chamber for guiding said copy sheet therefrom, a pair of pressure-applying rollers mounted adjacent the lower end of said guide surface for superposing a second sheet with each exposed area of said photosensitive sheet and so spreading a processing composition between the outer surfaces of said photosensitive and second sheets as to effect the processing of said sheets and produce a finished copy of said copy sheet, resilient means normally urging said rollers toward one another, a support element for guiding a second sheet into superposition with each exposed area of said photosensitive sheet as the latter is advanced between said pressure-applying rollers, said support element cooperating with said guide plate to define a second passage communicating with the exterior of said chamber immediately below said first passage, means normally closing said second passage to environmental light, and means for so mounting the last-mentioned means that it may be deflected to permit the movement of said second sheet through said passage.

6. The apparatus of claim 5 wherein drive means are provided for rotating at least one of said pressure-applying rollers to advance said photosensitive sheet through said apparatus.

7. In apparatus of the type defined in claim 5, in combination, means for varying the width of said aperture, said means comprising an elongated blade mounted between said aperture and said source of illumination, and means mounting said blade for movement into position to obstruct the passage of light through said aperture.

8. The apparatus of claim 5 wherein portions of said housing define a lighttight imbibition chamber adjacent said pressure-applying rollers into which a sandwich comprising said photosensitive sheet and said second sheet with said processing composition therebetween are advanced from said pressure-applying rollers.

9. In the apparatus of claim 8, the combination, with said pressure-applying rollers, of cutting means mounted within said imbibition chamber adjacent said rollers for severing portions of said photosensitive sheet advanced into said chamber from the remaining portions of said sheet, an opening in the end wall of said housing opposite said pressure-applying rollers through which said sandwich may be removed from said imbibition chamber when processing is complete, and a lighttight closure for said opening.

10. Photographic apparatus for copying sheet subject matter and comprising, in combination, housing means defining a lighttight chamber in which a supply of photosensitive sheet material is housed, means for advancing said photosensitive sheet within said chamber, means providing a passage into said chamber communicating with the exterior of said housing through which a copy sheet may be introduced into said chamber into superposition with an area of said photosensitive sheet, the last-named means including means for preventing light from entering said passage during movement of a copy sheet therethrough, means providing a support surface within said chamber across and in contact with which said photosensitive sheet is moved, means within said chamber adjacent the inner end of said passage and said support surface for superposing said copy sheet with said area of said photosensitive sheet and holding said sheets in superposition against a portion of said support surface during movement of said area of said photosensitive sheet and said copy sheet across said support surface, said portion of said support surface being light transmitting, means including a source of illumination for directing actinic light through said light-transmitting portion of said support surface for exposing said area of said photosensitive sheet and said copy sheet during movement thereof across said support surface, means providing a second passage from said chamber and communicating with the exterior of said apparatus and including means within said chamber for engaging said copy sheet as said sheets are moved across said support surface for separating said copy sheet from said photosensitive sheet and guiding said copy sheet from said housing through said second passage, pressure-applying means located within said chamber closely adjacent said support surface for superposing a second sheet with the exposed area of said photosensitive sheet and distributing a fluid composition, carried by container means associated with said second sheet, in a layer between the outer surfaces of said photosensitive and second sheets, means providing a third passage located adjacent said second passage communicating with the exterior of said apparatus and having an opening at its inner end located adjacent said pressure-applying means for guiding said second sheet into superposition with the exposed area of said photosensitive sheet, and means coupled with said third passage for preventing the admission of light into said passage during introduction of a second sheet and container of fluid processing composition therethrough.

References Cited in the file of this patent

UNITED STATES PATENTS

| | | |
|---|---|---|
| 2,427,443 | Cochran | Sept. 16, 1947 |
| 2,495,111 | Land | Jan. 11, 1950 |
| 2,525,720 | Pinkham | Oct. 10, 1950 |
| 2,552,251 | Bornemann | May 8, 1951 |
| 2,616,344 | Patience | Nov. 4, 1952 |
| 2,671,393 | Land | Mar. 9, 1954 |
| 2,732,778 | Limberger | Jan. 31, 1956 |

FOREIGN PATENTS

| | | |
|---|---|---|
| 508,259 | Great Britain | June 28, 1939 |